United States Patent [19]

Lindner

[11] 4,066,236
[45] Jan. 3, 1978

[54] CUBE CORNER TYPE RETROREFLECTOR BODIES AND MOLDS MADE THEREWITH

[75] Inventor: Henry Lindner, Elgin, Ill.

[73] Assignee: Beatrice Foods Co., Elgin, Ill.

[21] Appl. No.: 699,959

[22] Filed: June 25, 1976

[51] Int. Cl.² .............................................. B41B 11/54
[52] U.S. Cl. .................................. 249/160; 425/808; 425/DIG. 30; 249/187 R
[58] Field of Search ...................... 425/808, DIG. 30; 249/117, 160, 163, 165, 187 R

[56] References Cited

U.S. PATENT DOCUMENTS

| | | | |
|---|---|---|---|
| 1,591,572 | 7/1926 | Stimson | 425/808 X |
| 3,069,721 | 12/1962 | Arni et al. | 425/808 X |
| 3,277,535 | 10/1966 | Rupert | 425/808 X |
| 3,363,875 | 1/1968 | Hedgewick et al. | 425/808 X |
| 3,417,959 | 12/1968 | Schultz | 425/808 X |
| 3,443,281 | 5/1969 | Walby | 425/808 X |
| 3,649,153 | 3/1972 | Brudy | 425/808 UX |
| 3,811,647 | 5/1974 | Pink | 425/808 X |

FOREIGN PATENT DOCUMENTS 156,406  5/1954  Australia .................. 425/808

Primary Examiner—Ronald J. Shore
Attorney, Agent, or Firm—Hill, Gross, Simpson, Van Santen, Steadman, Chiara & Simpson

[57] ABSTRACT

Preformed electroforms are sliced into elongated slab shaped bodies having spaced generally parallel respective side walls so that an edge wall thereof has defined therein cube corner retroreflective units. When a plurality of such slab shaped bodies are positioned together to provide a region of cube corner type retroreflective units, there results a mold element which can be incorporated into a mold for making reflector units of transparent solid material or the like wherein angled retroreflective units and so-called standard retroreflective units are distributable over the entire face of a product reflector unit and from which air in the mold cavity can readily escape during filling in a molding operation.

19 Claims, 22 Drawing Figures

CUBE CORNER TYPE RETROREFLECTOR BODIES AND MOLDS MADE THEREWITH

BACKGROUND OF THE INVENTION

A cube corner type retroreflector, for example, that shown and described in the Heenan et al U.S. Pat. No. 3,541,606, which incorporates two or three different retroreflective areas, each area being comprised of a group of discrete reflector elements or units, each group having members with similar respective optical axes which are disposed collectively at an angle which differs from the corresponding angle in each of the other groups, suffers from the disadvantage that the total retroreflective surface region thereof has necessarily heretofore been comprised of such groups, and the total area each group occupies comprises a relatively large percentage of the total retroreflective surface region of such a given cube corner type reflector. Thus, if perchance a portion of the surface area of an individual retroreflector utilizing two or three such different groups of reflector elements therein is partially covered over as by a foreign body, so that, for example, the surface area occupied by one group of reflector elements is rendered non-functional, that reflector body itself is no longer fully retroreflective of light incident thereagainst, and thus that retroreflector is not retroreflective at the angles and to the extent previously served by the uncovered groups of reflector elements. This result, as a practical matter, can be regarded as having serious safety consequences, particularly in the area of reflectorized vehicles, such as bicycles, which are equipped with reflectors having multiple groups of discrete reflector elements. For example, a bicycle equipped with a reflector having two or three different groups of cube corner reflector elements therein, as indicated above, may no longer be seen by, for example, a motorist approaching such so-equipped moving bicycle at night from an angle of from about 40° to 70°, for example, if such reflector's wide angle groups are obscured by a spatter of road mud, or the like. Consequently, in the cube corner reflector art, there is a need for a cube corner type retroreflector having two or three different groups of discrete cube corner reflector elements therein comprising the entire retroreflective region with each group having its members with similar respective optical axes which are disposed at different angles as taught in the prior art, but wherein the individual members of these different groups are so-distributed and so intermixed across the entire such retroreflective region of such reflector that a partial obscuring of that reflector's retroreflective region does not stop completely the generation of a desired, designed pattern of light retroreflection intended to be achievable with such reflector.

Because cube corner type retroreflectors comprised of molded transparent solid material have heretofore characteristically been manufactured from molds having incorporated thereinto, as the molding surface for forming cube corner retroreflective units, monolithic electroforms made from entire groups or clumps of faceted pin bundles wherein individual pins are appropriately faceted and arranged so as to produce an electroformable surface incorporating a plurality of discrete reflector units, it has heretofore not been possible to produce reflectors of the class indicated above wherein two or more different groups of cube corner reflector elements are disposed over the entire region of such reflector. Thus, as those skilled in the art of cube corner reflector manufacture well know, molds for cube corner retroreflective surfaces are prepared by a manufacturing sequence in which tiny pins, which commonly can be hexagonally shaped, having like facets formed at a forward end of each pin, are grouped into a pattern or bundle. The faceted pin ends of the bundle then serve as a form or surface upon which an electroform mold is made. Electroform molds are currently made by electroplating nickel or the like onto and over a pin bundle so that, in such process, all points, including the high points and the low points, respectively, over such a group of pins are reversed in exact mirror image fashion in the product electroform over their respective locations in the pin bundle. Then, using the product electroform, a mold is made in which transparent plastic reflectors are moldable. Because of the small size of the individual cube corner retroreflective units in such an electroform, and also because of cube corner retroreflective unit geometries, it has heretofore been necessary in the manufacture of molds for making cube corner retroreflectors to employ individual electroform structures wherein all of the discrete cube corner retroreflective units therein comprising a region of retroreflective faceted units have optical axes disposed substantially parallel to one another. Then, in the process of making a completed mold, having two or three different groups of retroreflecting areas, several different types of separately formed electroform structures are mounted together usually and typically in adjoining, adjacent relationship, each individual such electroform structure being comprised of a plurality of cube corner retroreflective units wherein the optical axes are respectively disposed parallel to one another, thereby to achieve a reflector of the character as described, for example, in the afore mentioned Heenan et al U.S. Patent.

In addition to the prior art constraint above discussed whereby cube corner retroreflectors were required because of electroform considerations to have distinct, separate regions comprised of groups of like cube corner reflector units, another serious problem has arisen particularly in the manufacture of cube corner-type retroreflectors employing angled cube corner retroreflective units with optical axes angled or inclined with respect to a region axis normal to the region wherein cube corner retroreflective units are arranged (the arrangement usually being planar in configuration). This problem concerns the fact that, in a mold being used to make a cube corner retroreflector comprised of transparent solid material (comprising, for example, an organic plastic, such as an acrylic resin, a polycarbonate resin, or the like), elevated temperatures and pressures are employed. As hot, fluid plastic is injected into the mold, air must rapidly and easily escape therefrom so that such plastic can promptly fill completely the mold cavity. Experience has now shown that in a prior art reflector mold assembly under use conditions, air apparently vents more readily from so-called standard cube corner retroreflective regions formed in an electroform structure (e.g. regions wherein the individual reflective unit optical axes are perpendicular to the region axis) than from so-called angled cube corner retroreflective regions formed in an electroform structure (e.g. regions wherein the optical axes of the individual reflective units are inclined to the region axis).

The differences in air venting capability are shown by the respective different mold cycle lives associated with molds employing electroforms for standard cube corner optics as opposed to those employing wide angle cube corner optics. Thus, for example, electroforms of standard type cube corner reflector units permit contemporarily typically perhaps one million impressions under commonly used molds and molding conditions for acrylic and polycarbonate resins, whereas electroforms of wide angle type cube corner reflector units permit contemporarily typically only perhaps about one hundred thousand impressions to be made with comparable molds and under comparable molding conditions with the same resins. This difference is believed to be caused by the fact that the wide angle electroforms tend to experience burning during a reflector molding operation, the burning being caused by the development of extremely high, localized pressures in the vicinity of the individual cavities defining portions of the cube corner retroreflective units in an electroform. For example, localized fluidic (hydraulic) pressures of typically perhaps 8,000 to 20,000 pounds per square inch, depending upon equipment and processing conditions, are achieved in the region of such a unit in a single molding cycle while concurrently localized elevated temperatures under molding conditions can exist for short periods. Such conditions are sufficient to oxidize and destroy surface portions of an electroform over a relatively short period of successive cycles in mold operation and use. Because individual electroform bodies are commonly very expensive to manufacture, cube corner reflector manufacturers desire to obtain as many cycles as possible from an individual mold employing electroforms in order to hold down the manufacturing cost of the individual product reflectors made therewith.

There has thus developed a real need in the art of making cube corner retroreflectors for electroform constructions or equivalent which permit long life for those portions of the mold containing incorporated thereinto cube corner retroreflective units of so-called wide angle (e.g., unit optical axes being inclined up to about 30° relative to the region axis) retroreflective capability. The wide angle electroform constructions should have a mold cycle life at least approximately equal to that associated with so-called standard cube corner electroform constructions, and, furthermore, both types of electroform constructions should have long cycle lives in terms of capability of producing a product reflector having cheap manufacturing cost factors associated therewith for wide utilization in the marketplace by consumers. So far as is now known, no one has heretofore solved either the problem of air escape from molds incorporating wide angle cube corner reflective units defined in electroform bodies, or the problem of large area requirements for each group of cube corner retroreflective elements.

BRIEF SUMMARY OF THE INVENTION

In accordance with the present invention, there is provided a new and very useful technique for fabricating improved molds incorporating certain electroform constructions, such molds being adapted for the molding of cube corner type retroreflectors. The invention overcomes the previously described prior art problems and permits the fabrication of cube corner reflector molds having properties and characteristics which are heretofore unknown in the reflector art.

By the present invention, a preformed electroform body is selected which has formed therein a region of cube corner retroreflective units. Such electroform body can have been produced by the conventional fabrication techniques known to the prior art. In such region, the respective optical axes of all the individual cube corner reflective units are disposed substantially parallel to one another. Then, using a metal saw or the like, such a preformed electroform body is transversely sliced or cut up into a plurality of elongated slab shaped bodies each one having spaced, generally parallel respective side walls with connecting edge walls and end walls. This slicing is conducted in such a manner that, in each slab-shaped body, one edge wall thereof has defined therein a plurality of cube corner retroreflective units arranged in a row which extends lengthwise along and in the face of such one edge wall.

A plurality of the individual slab shaped bodies which result are then adapted to be mounted together in a side by side, preferably aligned, relationship into a block so as to, in effect, constitute a desired region of cube corner retroreflective units. By interposing in some chosen, appropriate, manner, in adjacent side by side relationship to one another, different slab shaped bodies, a wide variety of patterns of cube corner type retroreflective units can be produced. Various preferred arrangement for elongated slab shaped bodies are provided, and specifically illustrated, by the teachings of the present invention which demonstrate various new and optimized patterns for cube corner retroreflective regions. The invention further provides a technique and means for securing together such a bundle or group of slab shaped bodies into a monolithic structure for incorporation into a mold adapted for the manufacture of particular cube corner type retroreflectors.

In addition, when such elongated slab shaped bodies are put together in a desired alignment and arrangement, and are secured together so as to produce a desired region comprised of a plurality of cube corner retroreflective units as desired for the manufacture of a particular type of cube corner retroreflector body, there results a cube corner molding body from which, when incorporated into a product mold cavity, air can escape during plastic molding operations, even in the case of wide angle cube corner retroreflective units, so the operational temperature and pressure conditions inherently associated with a mold cavity during molding do not result in appreciable mold burning.

Other and further advantages, objects, aims, purposes, and the like will be apparent to those skilled in the art from the teachings of the present specification taken together with the appended drawings.

DETAILED DESCRIPTION

Figure 1:
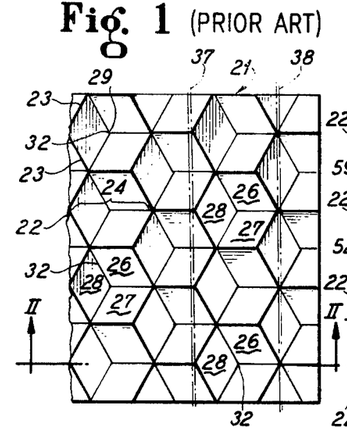
FIG. 1 is a plan view of the face of an electroform element having formed therein a plurality of retroreflective units of the so-called standard type, some parts thereof broken away.

Referring to FIG. 1, there is seen a plan view of one portion of an electroform element or body 21 in whose forward face as shown is formed a plurality of cube corner retroreflective units 22. Electroform 21, as those skilled in the art well know, is conveniently and conventionally formed from a plurality of hexagonally sided pins (not detailed; see, for example, FIGS. 11, 12 and 24 of U.S. Pat. No. 3,887,268 to Golden et al). As a consequence, the dimensions of each cube corner retroreflective unit 22 is determined by the dimensions of the pins employed. These dimensions, while subject, of course, to variation, depending upon the size of the hex rod used initially, typically have a distance along each side 23 thereof of about 0.094 inches, while the distance between opposing edges transversely thereacross, as shown by the numeral 24 though variable, is typically about 0.108 inches.

Figure 2:
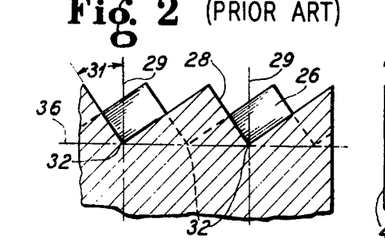
FIG. 2 is a vertical sectional view taken along the line II—II of FIG. 1.

Each cube corner retroreflective unit 22 is comprised of three faces or facets, designated as 26, 27 and 28, respectively, for one unit 22 in FIG. 1. Each facet 26, 27, and 28 is flat, and, in a cube corner retroreflective unit 22, the facets 26, 27 and 28 are substantially equal to one another in size. Each of the facets 26, 27, and 28 are arranged circumferentially about an optical axis 29 associated with each unit 22. In the embodiment shown in FIG. 1, each optical axis 29 extends perpendicularly to the face of body 21, and hence shows only as a point. As can be seen by reference to FIG. 2, each of the faces 26, 27 and 28 is inclined at a similar angle 31 relative to the optical axis 29. Also, the facets 26, 27 and 28 join at an apex point 32 which is along and coincident with the optical axis 29. The face shown of electroform body 21, as will hereinafter be fully explained, is used to form most of the back face 33 of a plastic reflector when element 21 is incorporated into a conventional mold, and such mold is used to form reflector 34.

In each unit 22, the relationship between the facets 26, 27 and 28 and their associated optical axis 29 is generally such that, in a molded reflector made therefrom, a ray of incident light striking one of the faces 26, 27 and 28 within a predetermined range of angles relative to the optical axis 29 is deflected successively against the other two of such faces and then is substantially retroreflected away from such cube corner retroreflective unit 22, as is known and understood in the art of cube corner reflectors.

Each respective optical axis 29 of each unit 22 is disposed substantially parallel to the respective other such optical axes 29 of the other units 22 in electroform body 21. Also, each respective such apex point 32 of each unit 22 is substantially coplanar with the respective other such apex points 32 of the other units 22 in electroform body 21. Observe that each apex point 32 in electroform body 21 is depressed relative to side portions 23 thereof. However, in plastic reflectors having a back face formed using body 21 an incident ray of light striking against the front face thereof must so strike such face within an angle of about up to a maximum of 30° on each side of the optical axis 29 in order to achieve retroreflection thereof, as desired. A cube corner reflector having such a retroreflection capability is termed a standard reflector in this art.

Figure 3:
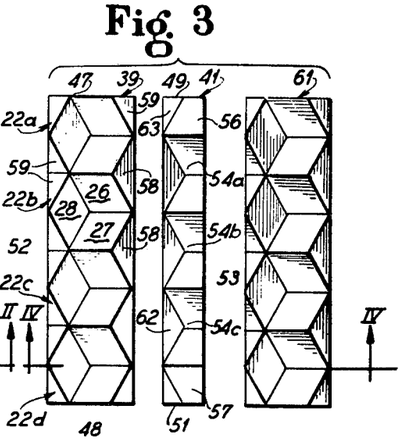
FIG. 3 is a plan view of two different forms of elongated slab shaped bodies of a type which result from a slicing up in one preferred manner of an electroform element of the type illustrated in FIG. 1.
Figure 4:
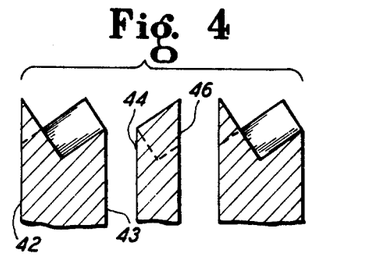
FIG. 4 is a vertical sectional view taken along the line IV—IV of FIG. 3.

In order to produce a preferred type of embodiment of the present invention, as illustrated in FIGS. 3 and 4, body 21 is sliced or cut, as with a circular metal saw blade rotating at high circumferential speed, as those skilled in the art of metal working will readily appreciate, so as to produce a saw kerf whose path and width are as represented by the dotted line pairs 37 and 38 in FIG. 1. Such a cutting produces two distinctively different slab shaped forms, identified as 39 and 41, respectively, in FIG. 3, for example. Slab shaped body or form 39 has spaced, generally parallel respective side walls 42 and 43 and body 41 similarly has spaced, parallel side walls 44 and 46. Such side walls terminate in end walls, such as end walls 47 and 48 (of body 39) and end walls 49 and 51 (of body 41). Similarly, edge walls interconnect the side walls of a slab-shaped body 39 or 41.

One edge wall of each slab-shaped body 39 or 41 (for example, edge wall 52 of body 39, and edge wall 53 of body 41) has defined therein a plurality of such cube corner retroreflective units 22 which are specifically designated in body 39 as units 22A, 22B, 22C and 22D, and in body 41 as units 54A, 54B, and 54C. In body 41, incomplete units 56 and 57 are disposed adjacent opposed ends 49 and 51, respectively.

Slab-shaped bodies having a form and construction as illustrated for body 39 represent a most preferred slab shaped body configuration in this invention. Observe that in body 39, each unit such as 22A terminates so as to have a side 23A of one facet 27 thereof coincident with a side 23A of facet 26 in an adjacent unit such as 22B. Also, the transverse width 40 of body 39 is equal to the distance 24 across a unit 22. With such a face for edge wall 52, a maximum number and density of units 22 are provided in edge wall 52. At the same time, the initial retroreflective efficiency and capability of each individual unit 22 is maintained intact. One half facet faces 58, and one quarter facet faces 59 exist characteristically along the side edges of edge wall 52; such fractional faces are also in adjacent relationship to the units 22 in body 39. Such fractional faces 58 abnd 59 can be brought to a level of some retroreflective usefulness in a product mold utilizing the teachings of this invention and incorporating a body 39, depending upon the manner in which such a body 39 is incorporated into a particular given mold assembly in combination with other bodies, as is explained and illustrated herein (see FIGS. 19 and 20).

Slab-shaped bodies of a character as represented by body 41 are less preferred by comparison to slab shaped bodies of a character as represented by body 39 for the principle reason that the retroreflective units 54 existing in wall 53 of body 41 are not of full and uniform size by comparison with units 22. Body 41 characteristically experiences a removal of electroform material along the opposed side walls 44 and 46 thereof in a sawing or cutting operation which results in its production along with bodies 39 and 61, which latter body 61 may be regarded as being identical to body 39 and which body 61 is produced in a manner substantially identical to that used to make body 39. The one half facet faces 62 and the one quarter facet faces 63 occurring along side wall 44 of body 41 can be made retroreflectively functional through combination of a body 41 with other appropriately shaped and cut bodies in suitable combination therewith in the assembly of a mold within the spirit and scope of the present invention, as those skilled in the art will appreciate.

Body 21 can be cut into other types of slab-shaped bodies with edge walls having different arrangements of retroreflective units thereon from that illustrated in FIG. 3, as those skilled in the art will appreciate. For example, body 21 can be cut in directions normal to that in which the saw curf paths 37 and 38 extend, and the resulting slab-shaped bodies will have edge walls with retroreflective characteristics; however, owing to the retroreflective unit density factor in such edge walls, as well as the factor of degree of retroreflective unit completeness present in an edge wall of a product slab-shaped body, such other possible cut configuration have less retroreflective efficiencies than those associated with slab-shaped bodies of the type and character illustrated by bodies 39 and 61, as hereinabove described, and hence are less preferred by comparison to such bodies 39 and 61.

As those skilled in the art will readily appreciate, individual slab-shaped bodies having cube corner retroreflective units arranged on an edge wall thereof characteristically have a plurality of cube corner retroreflective units arranged thereon in a row which extends lengthwise along such edge wall. Preferably, such row is so arranged that a side wall of one cube corner unit is adjacent and coincides with a side wall of another such unit. Also, preferably, the retroreflective units comprising a row involve units which are complete from the standpoint that each unit is comprised of preferably equally sized three facets. Also, preferably, such row is so arranged that a pair of opposed side walls of each cube corner unit are adjacent and coincide with the opposed side walls of the associated slab-shaped body.

In utilizing a given type or species of slab-shaped body produced in accordance with the teachings of this invention, it is customary and preferred to employ a plurality of such bodies arranged in a side wall to side wall adjacent relationship to one another. Preferably, the apex points in such an assembly of bodies are positioned so as to be coplanar from one such body to adjacent such bodies. Also, it is similarly preferred to align a pair of adjacent such bodies, when positioning such in a side-to-side relationship to one another to form an assembly thereof, to so-arrange one slab-shaped body relative to another than each one half facet faces or one quarter facet face along side edge walls portions thereof is aligned with edge located facet portions on adjacent bodies so as to produce at least some retroreflectivity potential from the resulting combination thereof even though such retroreflectivity may be less than the retroreflectivity associated potential with a single complete (full sized) cube corner retroreflective unit being used in such assembly howsoever formed. Thus, FIGS. 9 and 10 illustrate one arrangement of slab-shaped bodies with standard retroreflective facets, while FIGS. 11 and 12 illustrate another arrangement of slab-shaped bodies with standard retroreflective facets.

Figure 9:
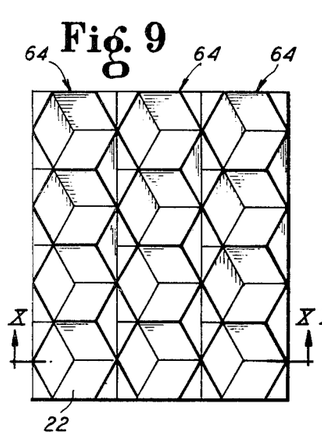
FIG. 9 is a plan view of one form of mold sub-assembly arrangement using a plurality of slab shaped bodies of a type illustrated in FIGS. 3 and 4.
Figure 10:
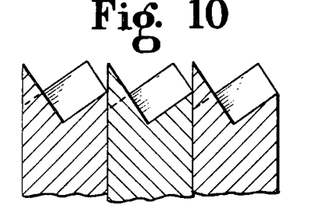
FIG. 10 is a vertical sectional view taken along the line X—X of FIG. 9.

In FIGS. 9 and 10 a plurality of slab-shaped bodies like bodies 39 and 61 are positioned together in a side-to-side relationship so as to provide a structure which in effect produces a pattern of cube corner retroreflective elements different from that in an electroform body 21 before such is sliced in accord with the teachings of this invention, this structure being designated by the numeral 64. Structure 64 is distinguishable from electroform body 21 by the fact that electroform body 64 has removed therefrom regions which correspond to slab-shaped body 41 plus saw curve thicknesses. In effect, the total number cube corner retroreflective units 22 contained in the total surface area of structure 64 is somewhat smaller than the total number of retroreflective units contained in a corresponding total surface area of an electroform body 21. Nevertheless, the difference in respective retroreflectivity potential between such comparable body 21 and structure 64 is sufficiently small so as not to impair the usefulness of such structure 64 in a mold structure for the making of retroreflector molded bodies to an appreciable extent for most practical purposes.

Figure 11:
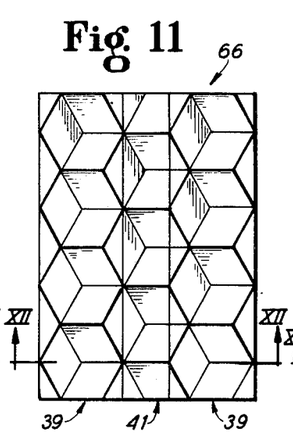
FIG. 11 is a plan view similar to FIG. 9 but showing an alternative form of mold subassembly arrangement using such a plurality of slab shaped bodies of types as illustrated in FIGS. 3 and 4.
Figure 12:
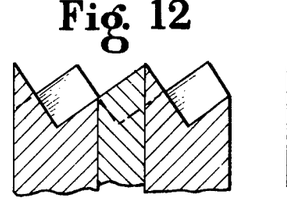
FIG. 12 is a vertical sectional view taken along the line XII—XII of FIG. 11.

FIGS. 11 and 12 illustrate a structure 66 of slab-shaped bodies 39 and 41 derived as explained from a body 21. Structure 66 has a pattern of retroreflective units which is comparable to that of the original body 21. The retroreflectivity of structure 66 is comparable to that of a body 21 of corresponding total surface area. As those skilled in the art will appreciate, in a structure 66, the slab-shaped body 41 can be replaced with another alternative body (not shown but so similar to body 41 in shape and edge pattern as to be comparable to body 41 for drawing purposes in this patent) which alternative body has been produced by sawing an electroform body, such as body 21, in a manner so as to compensate for saw curve width losses of the type occurring inherently with body 41 and as shown by the dotted lines 37 and 38 in FIG. 1. Such alternative body is used in combination with the bodies 39 so as to reconstitute rather exactly the surface configuration of an electroform body 21.

Production of slab-shaped bodies of the character contemplated by the present invention is not confined to a cutting up of an electroform body comprised of cube corner retroreflective units wherein the optical axes of the respective units 22 are perpendicular to the apex points of the individual units (e.g., standard cube corner retroreflective units), as those skilled in this art will readily appreciate. For example, the present invention is well adapted for use with cube corner retroreflective units wherein the optical axes of the individual units, thought parallel to one another, and having apex points in a common plane, have each of their optical axes inclined at some predetermined angle relative to the plane of apex points. Thus, for example, referring to FIG. 5 there is seen an electroform body 68 comprised of a multiplicity of individual cube corner retroreflective units 69. Here, each unit 69 incorporates three flat faces or facets identified, respectively, as 71, 72 and 73. Faces 71, 72 and 73 are arranged circumferentially about an optical axis 74 extending therethrough. All faces 71, 72 and 73 are inclined at a similar angle relative to such optical axis 74, and all of the faces 71, 72 and 73 meet on optical axis 74 in an apex point 76 (see FIG. 4). In body 68 the respective optical axes 74 of the individual units 69 are disposed substantially parallelly with respect to one another. Also, the respective apex points 76 are substantially coplanar with one another, as indicated. Analogously to unit 22 in body 21, the interrelationship between faces 71, 72 and 73 in a unit 69 is such that a ray of incident light striking one of such faces 71, 72 or 73 within a predeterminable range of angles relative to the optical axis 74 is deflected successively the other two such faces, and then is substantially retroreflected away from such cube corner retroreflective unit 69. In this way, depending upon the angle of inclination of each optical axis 74 to the plane 77 of apex points 76 in body 68, a wide variety of different retroreflective characteristics may be achieved for a product cube corner retroreflector. Retroreflectivity approaching 90° with respect to the plane 77 may be achieved, as those skilled in the art appreciate.

Figure 5:
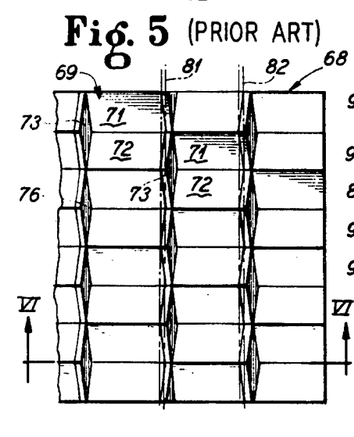
FIG. 5 is a plan view similar to FIG. 1 but showing an electroform element having formed therein a plurality of cube corner retroreflective units of the so-called wide angle type, some parts thereof broken away.
Figure 6:
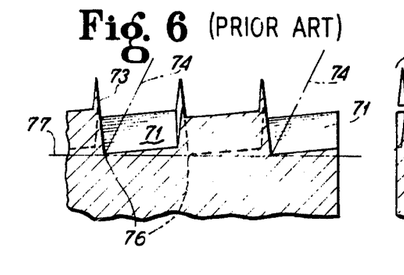
FIG. 6 is a vertical sectional view taken along the line VI—VI of FIG. 5.

A cube corner reflector having a retroreflection capability at an angle greater than 30°, approximately, with respect to a normal to a plane of apex points molded thereinto is commonly termed an angled reflector in this art. When such a reflector has retroreflective capability at angles up to about 50° or even more with respect to a normal to such plane of apex points, such reflector is termed a wide angle reflector in this art. In body 68, the respective optical axes 74 of the individual unit 69 are so angled as to produce, for present illustrative purposes, when a reflector is molded using such body 68, a so-called wide angle retroreflector.

Figure 7:
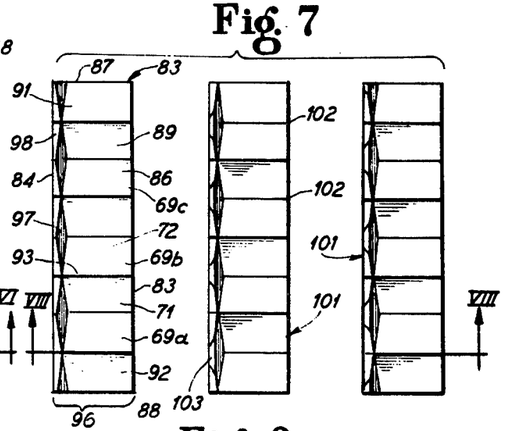
FIG. 7 is a plan view similar to FIG. 3 but showing elongated, slab shaped bodies of a type which result from a slicing up in one preferred manner of an electroform element of the type illustrated in FIG. 5.
Figure 8:
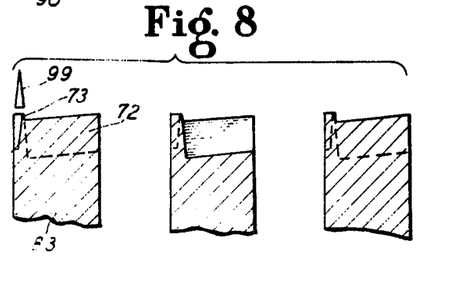
FIG. 8 is a vertical sectional view taken along the line VIII—VIII of FIG. 7.

In order to produce a preferred type of embodiment of the present invention, as illustrated in FIGS. 7 and 8, a body 68 is sliced or cut, as with a circular metal saw blade rotating at high circumferential speed, as those skilled in the art of metal-working will readily appreciate, so as to produce a saw kerf whose path and width are as represented by the dotted line pairs 81 and 82 in FIG. 5. Such a cutting produces slab-shaped forms identified as 83 in FIG. 7, for example. Slab-shaped bodies or forms 83 each have spaced, generally parallel respective side walls 84 and 86, and such side walls terminate in end walls 87 and 88. Similarly edge walls interconnect the side walls 84 and 86 of a slab-shaped body 83.

One edge wall 89 of each slab-shaped body 83 has defined therein a plurality of cube corner retroreflective units designated as units 69a, 69b, 69c, and 69d in one embodiment of a body 83 as shown in FIG. 7. In body 83, incomplete cube corner retroreflective units 91 and 92 are disposed adjacent opposed ends 87 and 88, respectively.

Slab-shaped bodies having a form and construction as illustrated in FIGS. 7 and 8 represent a most preferred slab-shaped body configuration in this invention. Observe that, in a body 83, each unit, such as 69a, terminates so as to have a side 93 of one facet 71 thereof coincident with a side 93 of facet 72 in an adjacent unit, such as 69b. Also, the transverse width 80 of a body 83 is equal to the distance across a unit 69. With such a face for edge wall 89, a maximum number and density of units 69 are provided in edge wall 89. At the same time, the initial retroreflective efficiency and capability of each individual unit 83 is reduced only slightly compared to its initial efficiency and capability in the starting electroform body 68. One half facet faces 97, and one quarter facet faces 98 exist characteristically along the edges of side wall 84; such fractional facet faces 97 and 98 are also in adjacent relationship to the adjoining units 69 in a body 83. Such fractional faces 97 and 98 can be brought to a level of some retroreflective usefulness in a product mold utilizing the teachings of this invention and incorporating a body 83, depending upon the manner in which such a body 83 is incorporated into a particular given mold assembly in combination with other bodies, as is explained and illustrated herein.

In a body 87 certain losses in the respective areas of facets 71 and 72 in each unit 69 occur, the exact loss in any given body 87 being dependent upon the width of the saw kerf, such as illustrated by the dotted line pairs 81 and 82. By placing the inherent material loss from saw kerfs on such facet pairs as 71 and 72, very little and preferably no diminution of the surface area associated with facet 73 of a unit 69 takes place, which is a significant consideration owing to the angle of inclination relative to the size of a facet 73, as those skilled in the art will appreciate.

As can be seen from FIG. 8, a body 83 characteristically has a plurality of spike-like projections 99 upstanding from edge wall 89. Each individual spike-like projection on one side thereof has formed therein the surface of a facet 73. Because spike-like projections 99 can possibly interfere with the formation of a molded plastic body (owing to plastic material hang-ups, mold burning considerations, and the like), and also because the area of each spike-like projection 99 extending beyond the tip edge 70 of each of facets 71 and 72 (see, for example FIG. 8), in a more preferred embodiment of the present invention the spike-like projections 99 in a body 83 are removed by an appropriate machining operation (e.g. grinding, or the like) so as to produce more preferred slab-shaped bodies 101 as illustrated in FIG. 7. Each body 101 thus has integrally formed therein as a part of each individual unit 102 thereof a small spot 103 which, retroreflectively, is substantially dead and inactive, as those skilled in the art will appreciate. Bodies 101 otherwise conform in dimension and characteristics to a body 83, and are otherwise similarly numbered for convenience.

Figure 13:
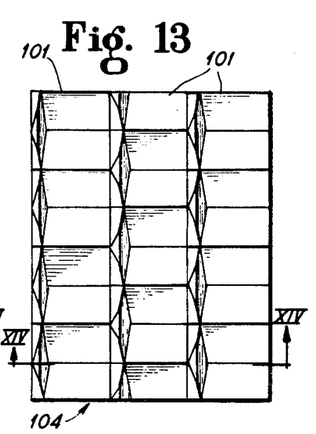
FIG. 13 is a plan view similar to FIG. 9 but showing an alternative form of mold subassembly arrangement using a plurality of slab shaped bodies of the type illustrated in FIGS. 7 and 8.
Figure 14:
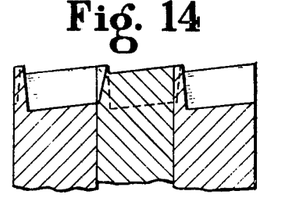
FIG. 14 is a vertical sectional view taken along the line XIV—XIV of FIG. 13.

Referring to FIGS. 13 and 14, there is seen an illustration of one arrangement, which is designated in its entirety by the numeral 104, of slab-shaped bodies 101 positioned together in a side-by-side relationship so as to provide a structure or arrangement which in effect is similar to the pattern of cube corner retroreflective elements occurring in an electroform body 68. In effect, the total number of cube corner retroreflective units 102 contained in a given total surface area of structure 104 is somewhat smaller than the total number of retroreflective units 69 contained in a corresponding total surface area of an electroform body 68; nevertheless, the difference in respective reflectivity potential between such structure 104 and body 68 is sufficiently small so as not to impair the usefulness of such structure 104 in a mold structure for making retroreflector molded bodies to an appreciable extent for most practical purposes. Note that the orientation in structure 104 of individual bodies 101 is such as to reproduce a pattern of units 102 similar to the pattern of units 69 in electroform 68.

Figure 15:
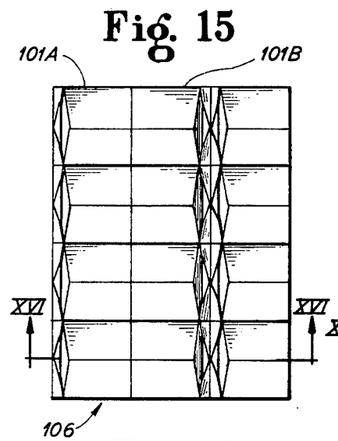
FIG. 15 is a plan view similar to FIG. 9 but showing a form of mold assembly arrangement using a plurality of slab shaped bodies of the type illustrated in FIGs. 7 and 8.
Figure 16:
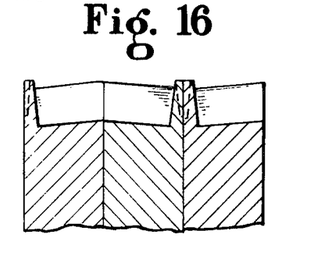
FIG. 16 is a vertical sectional view taken along the line XVI—XVI of FIG. 15.

In FIGS. 15 and 16, a plurality of slab-shaped bodies 101 are positioned together in a side-by-side relationship, but here alternate ones of the bodies 101 are turned end-for end. The result is that an adjacent pair of such bodies 101 can be considered to comprise a structure 106, as illustrated in FIGS. 15 and 16. The structure 106 thus produces a pattern of cube corner retroreflective elements which is distinctly different from that in an electroform body 68, for example, before such is sliced in accordance with the teachings of this invention. Structure 106, for a given total surface area thereof, has a total area of cube corner retroreflective units having a slightly smaller retroreflective capacity than is associated with the total surface area of retroreflective capacity in a comparably sized electroform body 68; nevertheless, the difference in respective retroreflectivity potential between such structure 106 and such electroform body 68 is sufficiently small so as not to impair the usefulness of such structure 106 in a mold structure for the making of retroreflector molded bodies to an appreciable extent for most practical purposes. One outstanding advantage associated with a structure 106 is the fact that such structure permits one to accomplish within a single region of wide angle retroreflectivity of the cube corner type both a left-hand and a right-hand pattern of wide angle retroreflectivity which is not possible and not achievable in the prior art using a single electroform body 68. The type of arrangement of bodies 101 in structure 106 produces a symmetrical left-hand and right-hand combined pattern of retroreflection. By varying the structure and the type of bodies incorporated into such a structure, one may produce non-symmetrical left-hand and right-hand patterns of angled retroreflectivity using cube corner type retroreflective units. In other words, it is not necessary to have incorporated into a given structure of slab-shaped bodies having angled cube corner retroreflective units formed in the respective faces thereof bodies derived from the same electroform starting body as respects individual cube corner characteristics.

Figure 22:
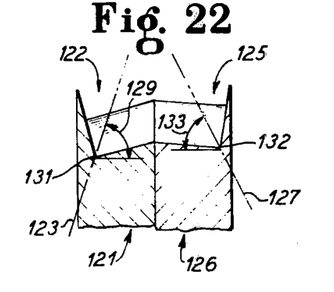
FIG. 22 is a vertical sectional view showing a form of mold assembly arrangement wherein adjacent slab shaped bodies each have formed therein cube corner retroreflective units of the wide angle type but wherein the adjacent respective cube corner retroreflective units in each slab shaped body have different optical axes.

Referring to FIG. 22, there is seen such an illustrative arrangement wherein a left-hand body 121 wherein the retroreflective units 122 thereof have optical axes inclined as shown by optical axis 123 and wherein the retroreflective units 125 of a right hand body 126 have optical axes inclined, as illustrated by optical axis 127. Axis 123 is inclined at a greater angle 129 to the plane 130 which is defined by apex points 131 and 132 than is the angle 133 at which axis 127 is inclined relative to such plane 130, axis 127 being inclined in a direction which is reverse to that associated with axis 123.

Figure 17:
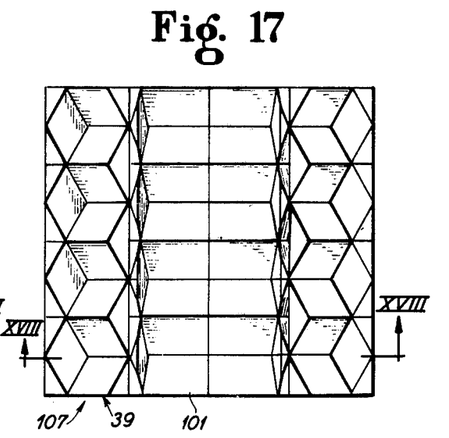
FIG. 17 is a plan view of one form of mold subassembly arrangement using a combination of slab shaped bodies of the type illustrated in FIGS. 3 and 4, and in FIGS. 7 and 8, respectively.
Figure 18:
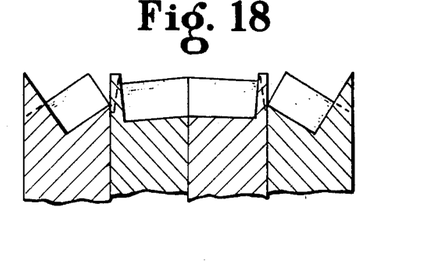
FIG. 18 is a vertical sectional view taken along the line XVIII—XVIII of FIG. 17.

Slab-shaped bodies having edge faces provided with standard cube corner retroreflective units may be combined with slab-shaped bodies having edge portions provided with wide angle cube corner retroreflective units. Thus, for example, in FIGS. 17 and 18 is illustrated an arrangement or structure 107 which incorporates a plurality of bodies 39 and a plurality of bodies 101. The bodies 101 are arranged in adjacent pairs with individual bodies being arranged in the manner earlier illustrated and above discussed in relation to FIG. 16 (see bodies 101a and 101b thereof). Between each such pair of bodies 101 is inserted a body 39. The resulting structure 107 has incorporated thereinto retroreflective capability extending from a left-hand wide angle retroreflective region through a central standard region over to a right-hand wide angle retroreflective region so that within a single such structure 107 there is provided an intermingling of three different regions of cube corner retroreflective facets which was not achievable by the prior art teachings, as hereinabove earlier explained. Many other arrangements of slab-shaped bodies can be produced in accordance with the teachings and principles of the present invention.

Figure 19:
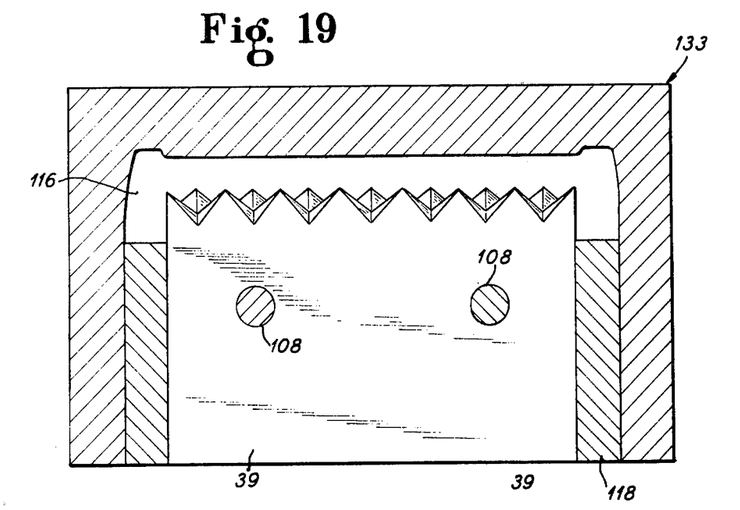
FIG. 19 is a vertical sectional view through the cavity region of a mold assembly having incorporated thereinto a subassembly arrangement, such as shown, for examples, in FIGs. 9 through 18.
Figure 20:
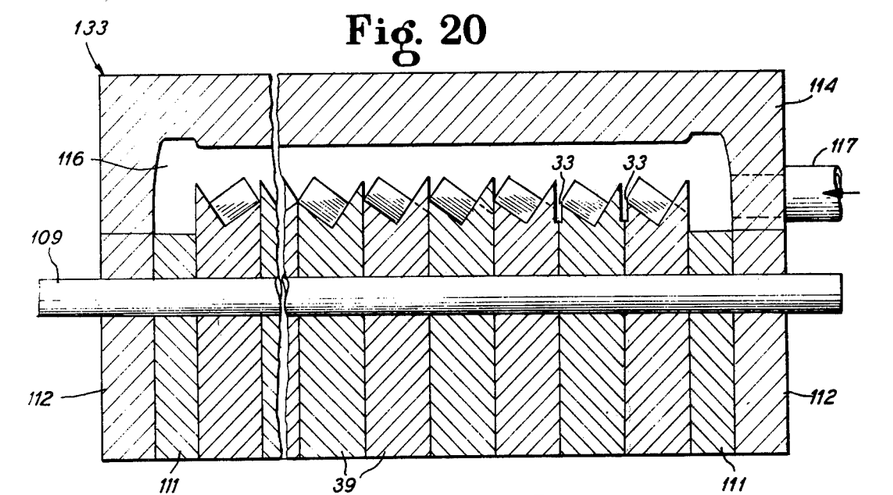
FIG. 20 is a sectional view through the assembly of FIG. 19 but showing another vertical sectional view taken normally to that view shown in FIG. 15, some parts thereof broken away.
Figure 21:
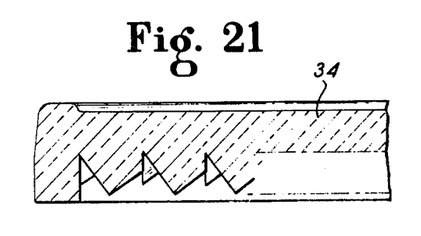
FIG. 21 is a diagrammatic vertical sectional view of a cube corner type retroreflector of a type such as can be produced using a mold assembly such as illustrated in FIGS. 19 and 20.

Any convenient technique for holding a plurality of slab-shaped bodies together in a desired side-by-side relationship one to another so as to provide a molding surface of desired characteristics may be employed, as those skilled in the art will appreciate, in the practice of the present invention. In one preferred mode as illustrated in FIGS. 19 and 20 a plurality of slab-shaped bodies here illustratively shown as bodies 39 which have been oriented together into a desired pattern, are maintained in such orientation by first drilling transversely through such bodies a plurality of bores, here illustrated by a pair of bores 108 which extend through all of the individual slab-shaped bodies 39. Then, through each bore 108 is extended a rod 109. Adjacent the opposed outside side face of each terminal slab-shaped body 39 is positioned a spacer plate 111, the spacer plates being fitted, in the embodiment shown, between the structure of bodies 39 and the wall 112 of the mold assembly 113. A second and mating wall 114 engages edge walls of wall 112, the mating wall 114 defining the front and side wall portions for a reflector mold cavity 116 while the assembly of slab-bodies 39, spacer plate 31, and wall 112 define, substantially, the rear face of the mold cavity 116. Retaining means for holding the rod 109 in a desired orientation and position may be provided as when a plurality of mold assemblies 113 are being employed in a single molding machine so that simultaneously a plurality of reflectors 34, such as shown in FIG. 21, can be made simultaneously.

An individual mold assembly 113 fabricated utilizing a plurality of slab-shaped bodies 39 has the capacity to vent air therefrom during a molding operation readily, simply and rapidly. This effect can be aided by providing grooves 33 in bodies 39 as shown in FIG. 20. Thus, air escapes through the small sized apertures or grooves 33 existing between individual adjacent slab-shaped bodies as the mold cavity 116 fills with a hot molten plastic fed into cavity 116 through an orifice 117. Grooves 33 can be formed by milling or the like, the mill width being such as to be below minimum resin fill capacity of a plastic hot mold during a molding operation.

As those skilled in the art appreciate, the viscosity characteristics typically and conventionally associated with a hot molten plastic resin, such as a polycarbonate resin or an acrylic resin, permit such resin to conform to cracks and apertures down to about 0.002 inch while the space between individual slab-shaped bodies required for venting of air therebetween can be an order of magnitude smaller than this (that is on the order of not larger than about 0.005 inch) in order to achieve an effective venting from cavities existing in the region of cube corner retroreflective units. If desired, grooves can be formed in individual slab-shaped bodies so that when a pair of such bodies are placed together in a side-by-side relationship to form a molding surface as described herein there remains air passageways; however, care must be taken to make sure that individual air passageways so defined remain smaller in dimension than about 0.0015 inch for the above indicated reasons associated with the molding of plastic resinous polymeric material.

In addition to the advantages above described and illustrated associated with slab-shaped bodies of the present invention and molds made therefrom, those skilled in the art will appreciate that a further advantage thereof is associated with the fact that should by chance a portion of the surface of a structure comprised of a plurality of slab-shaped mold bodies prepared as hereinabove described and illustrated be damaged, the structure may be repaired without discarding it in its entirety by simply replacing in such structure individual ones of the damaged slab-shaped bodies with new or undamaged bodies, or otherwise as desired.

Spacers 118 are positioned along opposed lateral side edges of the structure comprised of the plurality of slab-shaped bodies 39 so as to complete in a mold assembly 33 the definition of back side edges of the mold cavity 116.

Other and further embodiments, advantages, features and the like associated with and forming a part of the present invention will be apparent to those skilled in the art from the preceding description.

I claim:

1. An element for incorporation into a mold adapted for molding cube corner type retroreflectors comprising -
   A. an elongated slab-shaped body having spaced, generally parallel respective side walls with connecting edge walls and end walls;
   B. one edge wall having defined therein a plurality of cube corner retroreflective units arranged in a row which extends lengthwise along said one edge wall,
   C. each cube corner retroreflective unit being defined by three flat faces which are arranged circumferentially about an optical axis extending therethrough, all such faces being inclined at a similar angle relative to said optical axis, and all such faces meeting an apex point along said optical axis, the interrelationship between said faces and the associated said optical axis for each unit being such that a ray of incident light striking the predetermined surface of a body molded over said one edge wall and striking one of such faces in each unit molded in such molded body but within a predetermined range of angles relative to said optical axis as formed in said molded body is deflected successively against the other two said faces in such molded body and then is substantially retroreflected away from such cube corner retroreflective unit in such molded body,
   D. each respective such optical axis of all said retroreflective units being disposed substantially parallel to the respective other such optical axes of such cube corner reflective unit plurality, and
   E. each respective such apex point of each said cube corner retroreflective unit being substantially coplanar with the respective other such apex points of said cube corner reflective units comprising said plurality.

2. The element of claim 1 wherein said optical axes of said retroreflective units are oriented substantially perpendicularly to the plane defined by said apex points.

3. The element of claim 1 wherein said optical axes of said retroreflective units are oriented angularly with respect to the plane defined by said apex points.

4. The element of claim 1 wherein each unit thereof has a side edge which is substantially coincident with a side edge of each adjacent unit.

5. The element of claim 4 wherein each unit has faces which are substantially equal to one another in surface area and in shape.

6. The element of claim 4 wherein each unit has faces which are substantially equal to one another in surface area and in shape.

7. The element of claim 4 wherein each unit face has faces which are substantially equal to one another in surface area and in shape.

8. The element of claim 1 wherein each unit thereof has a pair of opposed side edges each one of which is coincident with a different one of the opposed side walls of said slab-shaped body.

9. The element of claim 1 wherein each unit thereof is defined by a perimeter which is hexagonal.

10. The element of claim 1 wherein each unit thereof
    a. has a side edge which is substantially coincident with a side edge of each adjacent unit;
    b. has a pair of opposed side edges each one of which is coincident with a different one of the opposed side walls of said slab shaped body;
    c. is defined by a perimeter which is hexagonal.

11. A subassembly adapted for forming a portion of the back face of a mold cavity of the type usable for molding transparent plastic reflectors, said subassembly comprising
    A. a plurality of elongated slab-shaped metallic bodies, each said body having spaced, generally parallel side walls with connecting edge walls and end walls, said plurality being arranged in side by side relationship one to another,
    B. one of said edge walls of each said body having defined therein a plurality of cube corner retroreflective units arranged in a row which extends lengthwise along said one edge wall, all said one edge wall is facing in one direction,
    C. each cube corner retroreflective unit of each said row being defined by three flat faces which are arranged circumferentially about an optical axis extending therethrough, said three faces being inclined at a similar angle relative to said optical axis, and said three faces meeting an apex point along said optical axis, the interrelationship between said three faces and the associated said optical axis for each unit being such that a ray of incident light which strikes a predetermined surface of a body molded over said one edge wall passes through said body, and strikes one of such faces in each unit molded in such molded body but within a predetermined range of angles relative to said optical axis as formed in said molded body is deflected successively against the other two said faces in such molded body and then is substantially retroreflected away from such cube corner retroreflective unit in such molded body, D. each respective such optical axis of all said retroreflective units being disposed substantially parallel to the respective other such optical axes of such cube corner reflective unit plurality in each said row, and E. each respective such apex point of each said cube corner retroreflective unit being substantially coplanar with the respective other such apex points of said cube corner reflective units comprising said plurality in each said row.

12. The subassembly of claim 11 wherein said optical axis of each said unit in each said row is oriented substantially perpendicularly to the plane defined by said apex points in each said row.

13. The subassembly of claim 11 wherein said optical axis of each said unit in each said row is oriented angularly with respect to the plane defined by said apex points in each said row.

14. The subassembly of claim 11 wherein one defined group of said bodies is intermixed with at least one other defined group of said bodies, the optical axis of each unit in each row of said one group being oriented substantially perpendicularly to the plane defined by said apex points, and the optical axis of each unit in each row of said other group being oriented angularly to said plane defined by said apex points.

15. A mold assembly comprising

A. a first mold means defining the rear wall and side wall portions of a cube corner type retroreflector, said first mold means having incorporated thereinto a subassembly of claim 11, the relationship between said first mold means and said subassembly being such that said subassembly is so positioned relative to said first mold means that said edge walls define a major portion of said rear wall, and B. a second mold means defining the front wall and side wall portions of said retroreflector, said second mold means cooperating with said first mold means to define between said front wall and said rear wall a mold cavity whose configuration corresponds to that desired for said retroreflector.

16. The mold assembly of claim 15 where said subassembly includes at least two different groups of slab-shaped bodies, the optical axis of each unit in each row of a first said group being oriented substantially perpendicularly to the other plane defined by the apex points of units in each row, and the optical axis of each unit in each such row of a second said group being oriented angularly to the plane defined by the apex points of each unit in each such row.

17. In a mold assembly of the type adapted for molding a cube corner type retroreflector, the improvement which comprises A. a mold subassembly functionally incorporated into said mold assembly and adapted to form the rear face portion of a cube corner type retroreflector, said mold subassembly being defined by a plurality of slab shaped bodies in adjacent relationship to one another, each such body having spaced, generally parallel side walls, said face portion being defined by edge portions of such plurality, B. such plurality comprising at least two different groups of slab shaped bodies, the bodies of each such group being similar to one another, and being interdigitated with one another, C. the edge portion of each such slab shaped body form a part of said face portion having defined therein a plurality of individually substantially complete cube corner retroreflective units arranged in a row longitudinally extending along such edge portion, D. said substantially complete retroreflective units comprising each row being substantially identical to each other, each substantially complete cube corner retroreflective unit in an individual said row being defined by three flat faces which are arranged circumferentially about an optical axis extending therethrough, said three faces being inclined at a similar angle relative to said optical axis, and said three faces meeting an apex point along said optical axis, the interrelationship between said three faces and the associated said optical axis for each such unit being such that a ray of incident light striking one of said three faces within a predetermined range of angles relative to said optical axis is deflected successively against the other two of said faces and then is substantially retroreflected away from said unit, E. said substantially complete retroreflective units comprising each row having substantially parallel respective said optical axes, substantially complete retroreflective units comprising each row having a substantially coplanar respective said apex points, F. the relationship between each said adjacent pair of rows, there being one row in each respective slab shaped body, being such that the respective angles between such plane of apex points and the said optical axes of said substantially complete retroreflective units in each such row of such pair are different from one another in orientation, G. regions of each said row in each edge portion of each such slab shaped body located laterally of each said retroreflective unit and adjacent at least one of said row edges being occupied by faces which are not associated with the substantially complete cube corner retroreflective units of each said row.

18. The mold assembly of claim 17 wherein said subassembly incorporates three of said groups of slab shaped bodies.

19. The mold assembly of claim 18 wherein in one of said groups said optical axes are oriented perpendicularly the plane defined by said apex points of said rows thereof.

* * * * *